United States Patent [19]

Kawaguchi et al.

[11] Patent Number: 4,629,758
[45] Date of Patent: Dec. 16, 1986

[54] ADHESIVE FOR RUBBER COMPOUNDS

[75] Inventors: Yasuyoshi Kawaguchi; Michio Ishii, both of Tokyo, Japan

[73] Assignee: Bridgestone Corporation, Tokyo, Japan

[21] Appl. No.: 737,860

[22] Filed: May 28, 1985

[30] Foreign Application Priority Data

May 28, 1984 [JP] Japan ................................ 59-107683

[51] Int. Cl.$^4$ ................................................ C08K 3/04
[52] U.S. Cl. ..................................... 524/495; 524/801
[58] Field of Search ................................. 524/495, 801

[56] References Cited

U.S. PATENT DOCUMENTS 4,497,927 2/1985 Tai et al. .............................. 524/801
4,539,365 9/1985 Rhee ................................... 524/495

Primary Examiner—Paul R. Michl
Assistant Examiner—Alex H. Walker
Attorney, Agent, or Firm—Sughrue, Mion, Zinn, Macpeak and Seas

[57] ABSTRACT

An adhesive for a rubber compound, comprising a water-in-oil emulsion containing a rubber, carbon black, a zinc compound, a tackifier, an organic solvent, a nonionic surfactant and water.

8 Claims, 1 Drawing Figure

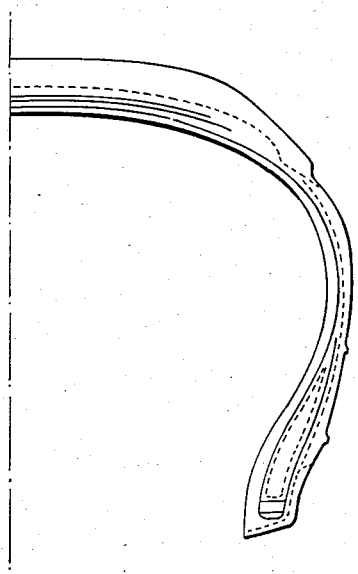

ADHESIVE FOR RUBBER COMPOUNDS

FIELD OF THE INVENTION

The present invention relates to an adhesive for rubber compounds, and more particularly to an adhesive for rubber goods such as tires, retreaded tires, hoses, belt conveyors and footwear, where the goods manufactured by adhesion processes of adhering unvulcanized rubber compounds, or an unvulcanized rubber compound and a vulcanized rubber compound together and vulcanizing them.

The adhesive functions as a pressure sensitive adhesive and vulcanizing adhesive which makes the sticking process easier and adhesion after vulcanization stronger.

BACKGROUND OF THE INVENTION

Adhesives which are solutions of rubber compounds in organic solvents having a boiling point of at most about 150° C. are used presently in adhesion processes of adhering unvulcanized rubber compounds, or an unvulcanized rubber compound and a vulcanized rubber compound together.

Recently, reductions in organic solvent emissions from adhesives have been investigated from the standpoint of industrial hygiene, prevention of disasters and conservation of oil resources. Attempts have been made not to use organic solvents, to decrease the content of organic solvents by using highly concentrated adhesives and to decrease the area of application of adhesives to the surfaces of rubber compounds by improving the formulation of rubber compounds. However, these attempts have been unsatisfactory in achieving low levels of organic solvents emission without adhesion difficulties. Therefore, it is of urgent necessity to achieve a new adhesive having good adhesion strength and with a low organic solvent content.

Oligomer type adhesives do not provide sufficient adhesiveness and good adhesion after vulcanization.

Latex type adhesives and oil-in-water type adhesives are water-based adhesives, and have such poor wettability to rubber compounds that sufficient tackiness cannot be obtained. Moreover, it is very difficult to remove water of the adhesives from the surface of the rubber compound and the adhesion after vulcanization is deteriorated due to the water present.

It is known that water-in-oil type adhesives have low organic solvent content and good wettability to rubber compounds and dispersed water particles of the adhesives so easily cohere due to mechanical stimuli such as supersonic waves that it is easy to remove water of the adhesives from the surface of rubber compounds.

European Patent Application No. 83305211.1 (corresponding to U.S. patent application Ser. No. 415,496 filed Sept. 7, 1982, now abandoned) discloses a tire tread adhesive comprising a water-in-oil emulsion with an organic solvent solution of a vulcanizable rubber compound as its oil phase. However, it is difficult to manufacture a stable water-in-oil emulsion because of the necessity to disperse water particles measuring several microns in diameter into the oil phase containing a rubber compound comprising a rubber and carbon black.

SUMMARY OF THE INVENTION

An object of the present invention is to provide a water-in-oil emulsion type adhesive which has the same tackiness and adhesion fatigue after vulcanization as an organic solvent solution type adhesive, which has a low organic solvent content and where water can be easily removed from the surfaces of rubber compounds.

The present invention, thus, provides an adhesive for rubber compounds comprising a water-in-oil emulsion containing (a) 100 parts by weight of a rubber selected from the group consisting of natural rubber, polyisoprene rubber, polybutadiene rubber, styrene-butadiene rubber (e.g., about 5 to 45 wt% styrene, and about 55 to 95 wt% butadiene), isobutylene-isoprene rubber (e.g., about 99 to 96 wt% isobutylene and about 1 to 4 wt% isoprene) and halogenated (e.g., chlorinated or brominated) isobutylene-isoprene rubber, (b) at least about 30 parts by weight of a carbon black having an iodine adsorption value (ASTM D 1510) of at least about 40 mg/g, (c) at least about 0.5 parts by weight, on an elemental zinc basis, of a zinc compound, (d) about 3 to about 30 parts by weight of a tackifier having an average molecular weight of between about 1,000 to about 10,000, (e) at least about 100 parts by weight of an organic solvent having a boiling point of at most about 150° C., (f) at least about 2 parts by weight of a non-ionic surfactant having an HLB value of more than about 2.0 and less than about 8.0 and (g) water at most about three times the volume of said rubber, said carbon black, said zinc compound, said tackifier, said organic solvent and said surfactant.

BRIEF DESCRIPTION OF THE ACCOMPANYING DRAWING

The FIGURE is a sectional view of a tire for a passenger car. The dotted lines denote the region where the adhesives tested were applied.

DETAILED DESCRIPTION OF THE INVENTION

In the present invention, at least about 30 parts by weight of a carbon black having an iodine adsorption value of between about 40 mg/g to about 150 mg/g is added to the adhesive, based on 100 parts by weight of the rubber component, in order to achieve a good adhesion fatigue property for the adhesive. Examples of commercially available carbon black which have an iodine adsorption value of at least about 40 mg/g are Seast SO (trademark for a FEF made by Tokai Carbon Black Company), Diablack H (trademark for a HAF made by Mitsubishi Chemical Industries), Continex ISAF (trademark for an ISAF made by Mitsui Toatsu Kagaku Co.) and Diablack A (trademark for a SAF made by Mitsubishi Chemical Industries).

It is preferred for the carbon black to have an iodine adsorption value of at least about 80 mg/g and for about 40 to about 90 parts by weight of the carbon black to be added to the adhesive composition, based on 100 parts by weight of the rubber component.

Zinc compounds are present in an amount of at least about 0.5 parts by weight, on an elemental zinc basis, to complete the vulcanizing reactions in the layer of the adhesive and achieve the good adhesion fatigue property of the adhesion. When one of the rubber compounds which should be adhered is capable of sulfur vulcanization, a certain amount of sulfur, accelerator and stearic acid migrates from the rubber compound to the layer of the adhesive before vulcanization. Therefore, sulfur, accelerators and stearic acid do not need to be added to the adhesive. However, zinc compounds such as zinc white, zinc carbonate, and zinc stearate should be added to the adhesive to complete the vulcanization because they migrate with difficulty.

It is preferred that zinc compounds be present in the adhesive in an amount of 1.0 to 2.5 parts by zinc weight based on 100 parts by weight of the rubber component.

It is necessary to add a tackifier having an average molecular weight of between about 1,000 to about 10,000 such as Lewisol 29-JA (trade name for an alkylphenol resin made by Hercules Inc.), Tackirol 101 (trade name for an alkylphenol resin made by Sumitomo Chemical Industries Co.), Petorsin (trade name for a petroleum hydrocarbon resin made by Mitsui Petrochemical Co.), and Koresin (trade name for a p-tert-butylphenol-acetylene resin made by Badische Anilin and Soda-Fabrik Co.) to the adhesive in order to improve the tackiness of the adhesive by decreasing the viscosity of the adhesive and increasing the contact area under pressure. Good tackiness is not achieved with use of less than about 3 parts by weight of the tackifier while the mechanical fatigue property of the adhesive after vulcanization is decreased with the use of more than about 30 parts by weight of the tackifier.

An organic solvent having a boiling point of at most about 150° C. such as toluene, xylene, n-hexane, n-heptane, cyclohexane and gasolines (for example, LA Gasoline, A Solvent and K Solvent made by Japan Petroleum Co.) is used in order that the organic solvent is evaporated easily from the layer of the adhesive. It is preferred to use about 200 to about 400 parts by weight of the organic solvent.

The HLB value of the non-ionic surfactant range from more than about 2.0 to less than about 8.0 and also the amount of the surfactant is at least about 2.0 parts by weight. The tackiness of the adhesive is not sufficient when the HLB value of the non-ionic surfactant is not more than about 2.0, while it is difficult to emulsify the adhesive when the HLB value of the non-ionic surfactant is not less than about 8.0 or the amount of the non-ionic surfactant is less than about 2.0 parts by weight. It is preferred to use about 3.0 to about 7.0 parts by weight of the non-ionic surfactant and for water to be present in an amount of about 2 to about 3 times the volume of the rubber, the carbon black, the zinc compound, the tackifier, the organic solvent and the non-ionic surfactant. The HLB value of the surfactant is evaluated using the Atlas HLB System.

Examples of suitable non-ionic surfactants include sorbitan stearate, propyleneglycol monostearate, sorbitan monooleate, diethyleneglycol monostearate, sorbitan monopalmitate, sorbitan tristearate, propyleneglycol monolaurate, sorbitan monostearate, sorbitan sesquioleate, sorbitan tristearate, propyleneglycol monostearate, glycol monostearate, propyleneglycol monolaurate, diethyleneglycol monostearate, glycerol monostearate and diethyleneglycol monolaurate.

A larger amount of the bound rubber of the adhesive improves the adhesion fatigue property. Therefore, it is preferred to mix carbon black with a rubber at a temperature above about 120° C. for more than about 30 seconds in the mixing of the rubber compounds and the adhesive. Better results are obtained by using an adhesive having a bound rubber of at least about 20%.

The adhesive according to the present invention may also contain vulcanizing agents (such as sulfur, sulfur chloride and alkylphenoldisulfide), accelerating agents (such as dibenzothiazyldisulfide, N,N'-dicyclohexyl-2-benzothiazolysulfenamide, N,-oxydiethylene-2-benzothiazole sulfenamide and diphenylguanidine), activators (such as stearic acid and oleic acid), and the like, as needed or desired.

The following examples are given for the purpose of further illustration of the present invention. They are not to be construed, however, as limiting the scope of the present invention. Unless otherwise indicated herein, all parts, percents, ratios and the like are by weight.

EXAMPLES 1 TO 7, COMPARATIVE EXAMPLES 1 TO 5

Each of twelve different adhesives were prepared as follows:

Natural rubber (100 parts by weight) was added to 400 parts by weight of gasoline. After 24 hours, 40 parts by weight of carbon black HAF, 5.0 parts by weight of a tackifier (alkylphenol resin, Tackirol 101 made by Sumitomo Chemical Industries Co.), 2.0 parts by weight of stearic acid, 3.0 parts by weight of zinc white, 2.0 parts by weight of sulfur and 1.0 parts by weight of an accelerating agent (N,-oxydiethylene-2-benzothiazole sulfenamide, Nocceler MSA.F made by Ouchishinko Chemical Co.) were added to the solution of natural rubber in gasoline. Then, the solution was homogenized by stirring at 2,000 rpm and a clearance of 4 mm using a table top homogenizer made by Nippon Seiki Manufacturing Co. for 3 minutes.

The homogenized solution was stirred again for 2 minutes after the surfactant was added to the solution. Distilled water (2,000 parts by weight) was added to the solution and the solution was stirred in the condition of 3,000 rpm and a clearance of 2 mm for 20 minutes. The emulsification characteristics were evaluated. The tackiness and the adhesion fatigue of the emulsified adhesive to the rubber compound (a tire tread compound) as shown in Table 1 was evaluated. The results obtained for each and the composition of the 12 adhesives are shown in Table 1 below.

TABLE 1

| Component | Parts By Weight |
|---|---|
| NR (RSS #4) | 70.0 |
| SBR 1500 | 30.0 |
| Carbon Black HAF | 60.0 |
| Cumarone-Indene Resin* | 5.0 |
| Petroleum Softener (Aromatic Oil) | 10.0 |
| Zinc White | 5.0 |
| Stearic Acid | 3.0 |
| N—Phenyl-N'—isopropyl-p-phenylenediamine | 1.0 |
| Diphenylguanidine | 0.1 |
| N,—oxydiethylene-2-Benzothiazolylsulfenamide | 0.7 |
| Sulfur | 1.8 |

*Cumarone CL made by Chisso Petrochemicals Co.

The test methods used for evaluation were as follows:
1. Water-in-Oil Type Emulsibility After an adhesive was stirred and stood for 24 hours, an adhesive with phase separation (oil phase and water phase separated) was evaluated as "No" and an adhesive where phase separation did not occur was evaluated as "Good".

2. Tackiness

An adhesive was applied to a 2 mm sheet of the rubber compound as shown in Table 1 above in an amount of 2 g per 100 cm² based on the dried adhesive after evaporation of water and solvent in the adhesive, and made visually uniform on the sheet with a spatula. The sample was tested after allowing it to stand for 4-5 hours and evaluated by measuring the tacking force when pressed for 20 seconds at a weight of 500 g with a Picma Type Tackiness Meter made by Toyo Seiki Co. The result was estimated by the arithmetic mean of ten times the values of the measurements.

3. Adhesion Fatigue

An adhesive was applied to the surfaces of sheets 5.2 mm thick of the rubber compound as shown in Table 1 above in the same manner for measurements of tackiness. After standing, the sheets were adhered together and cured in a mold of 10 mm thick at 150° C. for 40 minutes. The sample, consisting of the two cured sheets, was cut to a size of 25 mm wide, 150 mm long and 10 mm thick. After a center portion, 20 mm long, of the cured sheet was subjected to two repeated extension fatigue tests, which comprise stretching from 20 mm long to 40 mm long (100% elongation), and from 20 mm long to 60 mm long (200% elongation) by 100 times, 1,000 times and 5,000 times at a speed of 500 mm/min. with an Instron Tensile Tester, the adhesion fatigue was evaluated using a peeling test at 180° at a rate of 500 mm/min. When the sample was destroyed at the adhesive layers, the adhesive fatigue property was evaluated as "Bad". When the sample was destroyed at the rubber compound (the tire tread compound), the adhesive was evaluated as "Good".

TABLE 2

| | Comp. Ex. 1 | Ex. 1 | Ex. 2 | Ex. 3 | Ex. 4 | Ex. 5 | Comp. Ex. 2 | Comp. Ex. 3 | Comp. Ex. 4 | Ex. 6 | Ex. 7 | Comp. Ex. 5* |
|---|---|---|---|---|---|---|---|---|---|---|---|---|
| NATURAL RUBBER (RSS #4) | 100 | 100 | 100 | 100 | 100 | 100 | 100 | 100 | 100 | 100 | 100 | 100 |
| GASOLINE | 400 | 400 | 400 | 400 | 400 | 400 | 400 | 400 | 400 | 400 | 400 | 2400 |
| CARBON BLACK HAF | 40 | 40 | 40 | 40 | 40 | 40 | 40 | 40 | 40 | 40 | 40 | 40 |
| TACKIROL 101 | 5.0 | 5.0 | 5.0 | 5.0 | 5.0 | 5.0 | 5.0 | 5.0 | 5.0 | 5.0 | 5.0 | 5.0 |
| STEARIC ACID | 2.0 | 2.0 | 2.0 | 2.0 | 2.0 | 2.0 | 2.0 | 2.0 | 2.0 | 2.0 | 2.0 | 2.0 |
| ZINC WHITE | 3.0 | 3.0 | 3.0 | 3.0 | 3.0 | 3.0 | 3.0 | 3.0 | 3.0 | 3.0 | 3.0 | 3.0 |
| N,—OXYDIETHYLENE-2-BENZOTHIAZOLE SULFENAMIDE | 1.0 | 1.0 | 1.0 | 1.0 | 1.0 | 1.0 | 1.0 | 1.0 | 1.0 | 1.0 | 1.0 | 1.0 |
| SULFUR | 2.0 | 2.0 | 2.0 | 2.0 | 2.0 | 2.0 | 2.0 | 2.0 | 2.0 | 2.0 | 2.0 | 2.0 |
| SORBITAN TETRASTEARATE (1.5)** | 5.0 | 5.0 | — | — | — | — | — | — | — | — | — | — |
| SORBITAN TRISTEARATE (2.1) | — | — | 5.0 | — | — | — | — | — | — | — | — | — |
| PROPYLENEGLYCOL MONOSTEARATE (3.4) | — | — | — | 5.0 | — | — | — | — | — | — | — | — |
| SORBITAN MONOSTEARATE (4.3) | — | — | — | — | 5.0 | — | — | 1.0 | 1.5 | 20.0 | — | — |
| DIETHYLENEGLYCOL MONOSTEARATE (4.7) | — | — | — | — | — | 5.0 | — | — | — | — | — | — |
| SORBITAN MONOPALMITATE (6.7) | — | — | — | — | — | — | 5.0 | 5.0 | — | — | — | — |
| SORBITAN MONOLAURATE (8.6) | — | — | — | — | — | — | — | — | — | — | — | — |
| POLYOXYETHYLENE SORBITAN MONOOLEATE (10.0) | — | — | — | — | — | — | — | — | — | — | — | — |
| WATER | 2000 | 2000 | 2000 | 2000 | 2000 | 2000 | 2000 | 2000 | 2000 | 2000 | 2000 | 0 |
| WATER-IN-OIL TYPE EMULSIBILITY | GOOD | GOOD | GOOD | GOOD | GOOD | GOOD | NO | NO | NO | GOOD | GOOD | / |
| TACKINESS (g) | 630 | 840 | 790 | 830 | 760 | 890 | / | / | / | 850 | 1100 | 970 |
| ADHESION 100% ELONG. | BAD | GOOD | GOOD | GOOD | GOOD | GOOD | / | / | / | GOOD | GOOD | GOOD |
| FATIGUE 100 TIMES / 1000 TIMES | BAD | GOOD | GOOD | GOOD | GOOD | GOOD | / | / | / | GOOD | GOOD | GOOD |

*A conventional organic solvent solution type adhesive.
**HLB value.

EXAMPLES 8 TO 13

Six different adhesives were prepared and the tackiness and the adhesion fatigue properties were evaluated. Their formulation was the same as in Example 6. In these examples, natural rubber was mixed with carbon black HAF in an OOC type Banbury mixer before preparing the adhesives in order to increase the amount of bound rubber present. The elapsed times at above 120° C. in the mixer and the amounts of bound rubber of the adhesives are shown in Table 3.

Amount of Bound Rubber

An adhesive was applied to a sheet of glass and after water and organic solvent of the adhesive were removed from the adhesive, the adhesive was allowed to stand for 24 hours. About 0.3 g of the dried adhesive was weighed precisely, placed in a small container made of a wire net of 100 mesh and soaked in 200 cc of toluene for 48 hours. After allowing such to stand open in a room for 3 hours to remove the toluene, the sample was dried under vacuum for one hour and then weighed precisely.

The amount of bound rubber was obtained using the following formula:

$$\text{Amount of Bound Rubber (\%)} = \frac{\text{(Weight of Sample After Vacuum Drying)} - \text{(Estimated Amount of Carbon Black of Sample Before Soaking in Toluene)}}{\text{(Estimated Amount of Rubber of Sample Before Soaking in Toluene)}} \times 100$$

aromatic oil and activator such as stearic acid, zinc white and zinc stearate were mixed together in an OOC type Banbury mixer at above 120° C. for 40 to 60 seconds and then compounds were added to gasoline and the solution was homogenized by stirring sulfur and an accelerator as indicated in Table 4 below. The adhesives were prepared in the same way as described in Examples 1 to 7.

The tackiness and the adhesion fatigue were evaluated and the results obtained are shown in Table 4 below.

In Table 4, the iodine adsorption values of the carbon blacks were as follows:

| Carbon Black | IA (mg/g) |
|---|---|
| GPF | 36 |
| FEF | 42 |
| HAF | 82 |

In Table 4, the average molecular weight of the tackifiers was as follows:

| Tackifier | Average Molecular Weight |
|---|---|
| Lewisol 28-JA | 3,000 |
| Tackirol 101 | 5,000 |

TABLE 3

|  |  | Ex. 8 | Ex. 9 | Ex. 10 | Ex. 11 | Ex. 12 | Ex. 13 |
|---|---|---|---|---|---|---|---|
| Adhesive Composition | | | | Same as Example 6 | | | |
| Elapsed Time at Above 120° C. when Rubber Mixed with Carbon Black (Seconds) | | 0 | 5 | 20 | 30 | 40 | 60 |
| Amount of Bound Rubber (%) | | 12 | 14 | 14 | 20 | 22 | 21 |
| Tackiness (g) | | 920 | 960 | 1010 | 1080 | 980 | 1040 |
| ADHESION | 100% Elongation 1.000 Times | Good | Good | Good | Good | Good | Good |
|  | 200% Elongation 5.000 Times | Bad | Bad | Bad | Good | Good | Good |

EXAMPLES 14 TO 23, COMPARATIVE EXAMPLES 6 TO 14

Nineteen different adhesives were prepared as shown in Table 4 below. Rubber, carbon black, tackifier, heavy Comparative Example 13 in Table 4 is a conventional organic solvent solution type adhesive.

TABLE 4

|  | Example No. 14 | Example No. 15 | Comparative Example No. 6 | Comparative Example No. 7 | Example No. 16 | Example No. 17 | Example No. 18 | Comparative Example No. 8 | Example No. 19 |
|---|---|---|---|---|---|---|---|---|---|
| Natural Rubber (RSS #4) | 100 | 20 | 100 | 100 | 100 | 100 | 100 | 100 | 100 |
| SRB 1500 | — | 80 | — | — | — | — | — | — | — |
| Carbon Black GPF | — | — | 50 | — | — | — | — | — | — |
| Carbon Black FEF | — | — | — | 25 | 30 | 50 | — | — | — |
| Carbon Black HAF | 50 | 50 | — | — | — | — | 50 | 50 | 50 |
| Petroleum Softener (Heavy Aromatic Oil) | 10 | 10 | 10 | 10 | 10 | 10 | 40 | — | — |
| Lewisol 28-JA | — | — | — | — | — | — | — | 40 | 30 |
| Tackirol 101 | 5 | 5 | 5 | 5 | 5 | 5 | 5 | 5 | 5 |
| Stearic Acid | 2.0 | 2.0 | 2.0 | 2.0 | 2.0 | 2.0 | 2.0 | 2.0 | 2.0 |
| Zinc White | 3.0 | 3.0 | 3.0 | 3.0 | 3.0 | 3.0 | 3.0 | 3.0 | 3.0 |
| Zinc Stearate | 0 | 0 | 0 | 0 | 0 | 0 | 0 | 0 | 0 |
| Amount of Zinc (Elemental) | 2.4 | 2.4 | 2.4 | 2.4 | 2.4 | 2.4 | 2.4 | 2.4 | 2.4 |
| N,—Oxydiethylene-2- | 1.0 | 1.0 | 1.0 | 1.0 | 1.0 | 1.0 | 1.0 | 1.0 | 1.0 |

TABLE 4-continued

| benzothiazole sulfenamide | | | | | | | | | |
|---|---|---|---|---|---|---|---|---|---|
| Sulfur | 2.0 | 2.0 | 2.0 | 2.0 | 2.0 | 2.0 | 2.0 | 2.0 | 2.0 |
| Gasoline | 500 | 500 | 500 | 500 | 500 | 500 | 500 | 500 | 500 |
| Water | 2000 | 2000 | 2000 | 2000 | 2000 | 2000 | 2000 | 2000 | 2000 |
| Sorbitan Monostearate | 5.0 | 5.0 | 5.0 | 5.0 | 5.0 | 5.0 | 5.0 | 5.0 | 5.0 |
| Tackiness (g) | 960 | 640 | 1120 | 1030 | 1010 | 970 | 780 | more than 1500 | 1340 |
| Adhesion Fatigue 100% Elong. 1000 Times | GOOD | GOOD | GOOD | GOOD | GOOD | GOOD | GOOD | BAD | GOOD |
| 100% Elong. 5000 Times | GOOD | GOOD | BAD | BAD | GOOD | GOOD | GOOD | — | BAD |

|  | Example No. | | Comparative Example No. | | Example No. | | Comparative Example No. | Example No. | Comparative Example No. | |
|---|---|---|---|---|---|---|---|---|---|---|
|  | 20 | 21 | 9 | 10 | 22 | 23 | 11 | 24 | 12 | 13 |
| Natural Rubber (RSS #4) | 100 | 100 | 100 | 100 | 100 | 100 | 100 | 100 | 100 | 100 |
| SRB 1500 | — | — | — | — | — | — | — | — | — | — |
| Carbon Black GPF | — | — | — | — | — | — | — | — | — | — |
| Carbon Black FEF | — | — | — | — | — | — | — | — | — | — |
| Carbon Black HAF | 50 | 50 | 50 | 50 | 50 | 50 | 50 | 50 | 50 | 50 |
| Petroleum Softener (Heavy Aromatic Oil) | — | — | — | 10 | 10 | 10 | 10 | 10 | 10 | 10 |
| Lewisol 28-JA | — | — | — | — | — | — | — | — | — | — |
| Tackirol 101 | 20 | 30 | 40 | 5 | 5 | 5 | 5 | 5 | 5 | — |
| Stearic Acid | 2.0 | 2.0 | 2.0 | — | — | — | — | — | — | 2.0 |
| Zinc White | 3.0 | 3.0 | 3.0 | — | 3.0 | 1.0 | 0.5 | — | — | 3.0 |
| Zinc Stearate | 0 | 0 | 0 | 0 | 0 | 0 | 0 | 6.0 | 3.0 | 0 |
| Amount of Zinc (Elemental) | 2.4 | 2.4 | 2.4 | 0 | 2.4 | 0.8 | 0.4 | 0.6 | 0.3 | 2.4 |
| N,—Oxydiethylene-2-benzothiazole sulfenamide | 1.0 | 1.0 | 1.0 | | | | | | | 1.0 |
| Sulfur | 2.0 | 2.0 | 2.0 | | | | | | | 2.0 |
| Gasoline | 500 | 500 | 500 | 500 | 500 | 500 | 500 | 500 | 500 | 1500 |
| Water | 2000 | 2000 | 2000 | 2000 | 2000 | 2000 | 2000 | 2000 | 2000 | |
| Sorbitan Monostearate | 5.0 | 5.0 | 5.0 | 5.0 | 5.0 | 5.0 | 5.0 | 5.0 | 5.0 | |
| Tackiness (g) | 1200 | more than 1500 | more than 1500 | 1060 | 980 | 1110 | 1020 | 1050 | 990 | 1040 |
| Adhesion Fatigue 100% Elong. 1000 Times | GOOD | GOOD | BAD | GOOD | GOOD | GOOD | GOOD | GOOD | GOOD | GOOD |
| 100% Elong. 5000 Times | GOOD | GOOD | — | BAD | GOOD | GOOD | BAD | GOOD | BAD | GOOD |

The adhesives, of Comparative Examples 6, 9 and 13 and Examples 17 and 22 in Table 4, were employed as adhesives for test tires for passenger cars (size: 175 SR14), respectively. The amount of the adhesive used was 2 g per 100 cm² based on the completely dried adhesive. The adhesives were applied to the splice and superposing portions corresponding to the dotted lines in the FIGURE showing test tires for passenger cars.

The durability of the test tires was evaluated by running without a break and with an inner pressure of 1.70 Kg/cm² under a load of 675 Kg at a speed of 60 Km/Hr for 500 hours on a drum with an outer diameter of 1.7 m.

The results obtained are shown in Table 5 below. The results in Table 5 shows that the adhesives of Examples 17 and 22 in the present invention have the same durability as the conventional organic solution type adhesive of Comparative Example 13.

The tires using the adhesives of Comparative Examples 6 and 9 were deformed and destroyed during the running. The tires were checked precisely in the deformed portions and the layers of the adhesive were found to be broken.

TABLE 5

|  | Tire No. | | | | |
|---|---|---|---|---|---|
|  | 1 | 2 | 3 Comparative | 4 Comparative | 5 Comparative |
| Adhesive Applied | Example 17 | Example 22 | Example 6 | Example 9 | Example 13 |
| Durability of Tire | No breakdown after lapse of 500 hours | No breakdown after lapse of 500 hours | Breakdown after lapse of 380 hours | Breakdown after lapse of 240 hours | No breakdown after lapse of 500 hours |

As explained above in the Examples and Comparative Examples, the present invention provides a novel and advantageous adhesive which improves industrial hygiene and conserves oil resources and maintains almost the same tackiness and adhesion fatigue as a conventional organic solvent solution type adhesion.

The adhesive of the present invention is useful as an adhesive for, e.g., tires, belt conveyors and other rubber goods.

While the invention has been described in detail and with reference to specific embodiments thereof, it will be apparent to one skilled in the art that various changes and modifications can be made without departing from the spirit and scope thereof.

What is claimed is:

1. An adhesive for a rubber compound, comprising a water-in-oil emulsion containing
   (a) 100 parts by weight of a rubber selected from the group consisting of natural rubber, polyisoprene rubber, polybutadiene rubber, styrene-butadiene rubber, isobutylene-isoprene rubber and halogenated isobutylene-isoprene rubber,
   (b) at least about 30 parts by weight of a carbon black having an iodine adsorption value of at least about 40 mg/g,
   (c) at least about 0.5 parts by weight, on an elemental zinc basis, of a zinc compound,
   (d) about 3 to about 30 parts by weight of a tackifier having an average molecular weight of between about 1,000 to about 10,000,
   (e) about 200 to about 400 parts by weight of organic solvent having a boiling point of about 150° C. or less,
   (f) at least about 2 parts by weight of a nonionic surfactant having an HLB value of more than about 2.0 and less than about 8.0, and
   (g) water in an amount of at most about three times the total volume of the volume of said rubber (a), said carbon black (b), said zinc compound (c), said tackifier (d), said organic solvent (e) plus said nonionic surfactant (f).

2. The adhesive of claim 1, wherein said carbon black (b) has an iodine adsorption value of at least about 80 mg/g.

3. The adhesive of claim 1, wherein the amount of said carbon black (b) is about 40 to about 90 parts by weight.

4. The adhesive of claim 1, wherein the amount of said zinc compound (c) is about 1.0 to about 2.5 parts by zinc weight.

5. The adhesive of claim 1, wherein said HLB value of said nonionic surfactant (f) is about 3.0 to about 7.0.

6. The adhesive of claim 1, wherein the amount of said nonionic surfactant (f) is about 3.0 to about 20.0 parts by weight.

7. The adhesive of claim 1, where the volume of water (g) is about 2 to about 3 times the volume of said rubber (a), said carbon black (b), said zinc compound (c), said tackifier (d), said organic solvent (e) and said nonionic surfactant (g).

8. The adhesive of claim 1, wherein the rubber has a bound rubber content of at least about 20%.

* * * * *